United States Patent
Brandt

(10) Patent No.: US 10,648,364 B2
(45) Date of Patent: May 12, 2020

(54) TURBOCHARGER

(71) Applicant: MAN Energy Solutions SE, Augsburg (DE)

(72) Inventor: Sven Brandt, Munich (DE)

(73) Assignee: MAN Energy Solutions SE, Augsburg (DE)

(*) Notice: Subject to any disclaimer, the term of this patent is extended or adjusted under 35 U.S.C. 154(b) by 0 days.

(21) Appl. No.: 16/191,518

(22) Filed: Nov. 15, 2018

(65) Prior Publication Data
US 2019/0145279 A1 May 16, 2019

(30) Foreign Application Priority Data
Nov. 16, 2017 (DE) .......................... 10 2017 126 933

(51) Int. Cl.
| | |
|---|---|
| *F16C 17/02* | (2006.01) |
| *F01D 25/16* | (2006.01) |
| *F02C 7/06* | (2006.01) |
| *F01D 25/18* | (2006.01) |
| *F02C 6/12* | (2006.01) |

(52) U.S. Cl.
CPC ............ *F01D 25/168* (2013.01); *F01D 25/18* (2013.01); *F02C 6/12* (2013.01); *F02C 7/06* (2013.01); *F05D 2220/40* (2013.01); *F05D 2240/52* (2013.01); *F05D 2260/98* (2013.01)

(58) Field of Classification Search
CPC ........ F16C 17/02; F16C 17/04; F16C 33/103; F16C 33/1045; F16C 2360/24; F01D 25/166; F01D 25/168; F05D 2240/52; F05D 2240/54
See application file for complete search history.

(56) References Cited

U.S. PATENT DOCUMENTS

| | | | | |
|---|---|---|---|---|
| 6,155,720 | A * | 12/2000 | Battig | F16C 27/02 384/99 |
| 9,777,597 | B1 * | 10/2017 | Bischof | F16C 17/107 |
| 2013/0205775 | A1 * | 8/2013 | Begin | F01D 25/166 60/605.3 |
| 2015/0267740 | A1 * | 9/2015 | Ryu | F01D 25/16 384/103 |
| 2015/0315932 | A1 * | 11/2015 | Ryu | F01D 25/166 384/108 |

FOREIGN PATENT DOCUMENTS

DE  102013002605  8/2014

* cited by examiner

*Primary Examiner* — Phillip A Johnson
(74) *Attorney, Agent, or Firm* — Cozen O'Connor

(57) ABSTRACT

A turbocharger, including a turbine with a turbine rotor, a compressor with a compressor rotor coupled to the turbine rotor via a shaft. At least one bearing, via which the shaft is mounted in the bearing housing, wherein the respective bearing comprises a bearing bush mounted in the bearing housing in a rotationally fixed manner, wherein between the bearing bush and the bearing housing a radially outer lubricating gap and between the bearing bush and the shaft a radially inner lubricating gap is formed. The radially inner lubricating gap is suppliable with lubricating oil via at least one line introduced into the bearing bush, wherein the or each line introduced into the bearing bush, which serves for the oil supply of the radially inner lubricating gap, leads into a lubricating oil pocket of the bearing bush each, which based on the axial length of the bearing bush is placed off-center.

19 Claims, 2 Drawing Sheets

TURBOCHARGER

FIELD OF THE INVENTION

The invention relates to a turbocharger and more specifically to the lubrication of the bearing bush of the shaft connecting the compressor rotor and the turbine rotor.

BACKGROUND OF THE INVENTION

From DE 10 2013 002 605 A1, the content of which is hereby incorporated herein in its entirety, the fundamental construction of a turbocharger is known. A turbocharger comprises a turbine, in which a first medium is expanded. A turbocharger, furthermore, comprises a compressor in which a second medium is compressed, namely utilising energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor a bearing housing is positioned, wherein the bearing housing is connected on the one hand to the turbine housing and on the other hand to the compressor housing. In the bearing housing, a shaft is mounted via which the turbine rotor is coupled to the compressor rotor.

From practice it is known that the shaft, which couples the turbine rotor of the turbine to the compressor rotor of the compressor, is mounted in the bearing housing via at least one bearing. For mounting the shaft, the respective bearing of the bearing housing comprises a bearing bush, which is either mounted in the bearing housing in a rotationally fixed manner or can rotate in the same. The invention present here relates to a turbocharger, in which, in the region of at least one bearing of the bearing housing, the bearing bush of the bearing is mounted in the bearing housing in a rotationally fixed manner. Between the bearing housing and the bearing bush, a radially outer lubricating gap and between the bearing bush and the shaft a radially inner lubricating gap is formed. The radially outer lubricating gap formed between the bearing housing and the bearing bush mounted in the bearing housing in a rotationally fixed manner is also referred to as squeeze film damper.

The radially inner lubricating gap is suppliable with lubricating oil via at least one line introduced into the bearing bush, in turbochargers known from practice, emanating from the radially outer lubricating gap.

SUMMARY OF THE INVENTION

According to the present invention, the or each line introduced into the bearing bush, which serves for the oil supply of the radially inner lubricating gap, leads into a lubricating oil pocket of the bearing bush, which based on the axial length of the bearing bush is placed off-center and which is preferentially set at an incline relative to the axial direction of the bearing bush and relative to the direction of rotation of the shaft. Because of the fact that in the turbocharger according to the invention the respective line introduced into the bearing bush, which serves for the oil supply of the radially inner gap, leads into a lubricating oil pocket of the bearing bush that is off-center and preferentially set at an incline relative to the axial direction of the bearing bush and relative to the direction of rotation of the shaft, the lubricating oil can be particularly advantageously delivered in the direction of the radially inner lubricating gap, namely in that the rotation of the shaft promotes or supports the delivery of the lubricating oil in the direction of the radially inner lubricating gap.

Preferentially, the or each lubricating oil pocket merges into a lubricating oil groove in each case, which is also set at an incline relative to the axial direction of the bearing bush and of the direction of rotation of the shaft in particular in such a manner that lubricating oil grooves introduced into the bearing bush diverge, emanating from an axial end of the bearing bush via which the oil supply of the bearing bush is effected, in the direction of an axial end of the bearing bush located opposite. Through this configuration of the lubricating oil grooves, the lubricating oil can be particularly advantageously delivered into the radial inner lubricating groove utilizing the shaft rotation.

According to an advantageous further development of the invention, the radially outer lubricating gap and the radially inner lubricating gap are suppliable with lubricating oil emanating from an oil supply main line independently of one another. Preferentially, the radially outer lubricating gap is suppliable with lubricating oil via at least one first line branching off the oil supply main line, wherein the radially inner lubricating gap is suppliable with lubricating oil via a second line branching off the oil supply main line. The inner lubricating gap is then supplied with lubricating oil not emanating from the outer lubricating gap but rather emanating from the oil supply main line. There is then no risk that through the oil supply of the radially inner lubricating gap the functionality of the radially outer lubricating gap is negatively affected. The radially outer lubricating gap can exercise its function as squeeze film damper without interference.

According to an advantageous further development of the invention, the or each first line leads into the radially outer lubricating gap radially outside, wherein the or each second line leads into an annular passage of the bearing housing on an axial side of the bearing bush. The or each line introduced into the bearing bush delivers the lubricating oil, emanating from the annular passage, into the region of the radially inner lubricating gap. Preferentially, the or each line introduced into the bearing bush is set at an incline relative to the axial direction and/or relative to the radial direction of the bearing bush. This also serves to support the lubricating oil delivery into the region of the radially inner lubricating gap without the risk of negatively affecting the squeeze film damper function of the radially outer lubricating gap.

BRIEF DESCRIPTION OF THE DRAWINGS

Exemplary embodiments of the invention are explained in more detail by way of the drawing in which.

DETAILED DESCRIPTION OF THE PRESENTLY PREFERRED EMBODIMENTS

Figure 1:
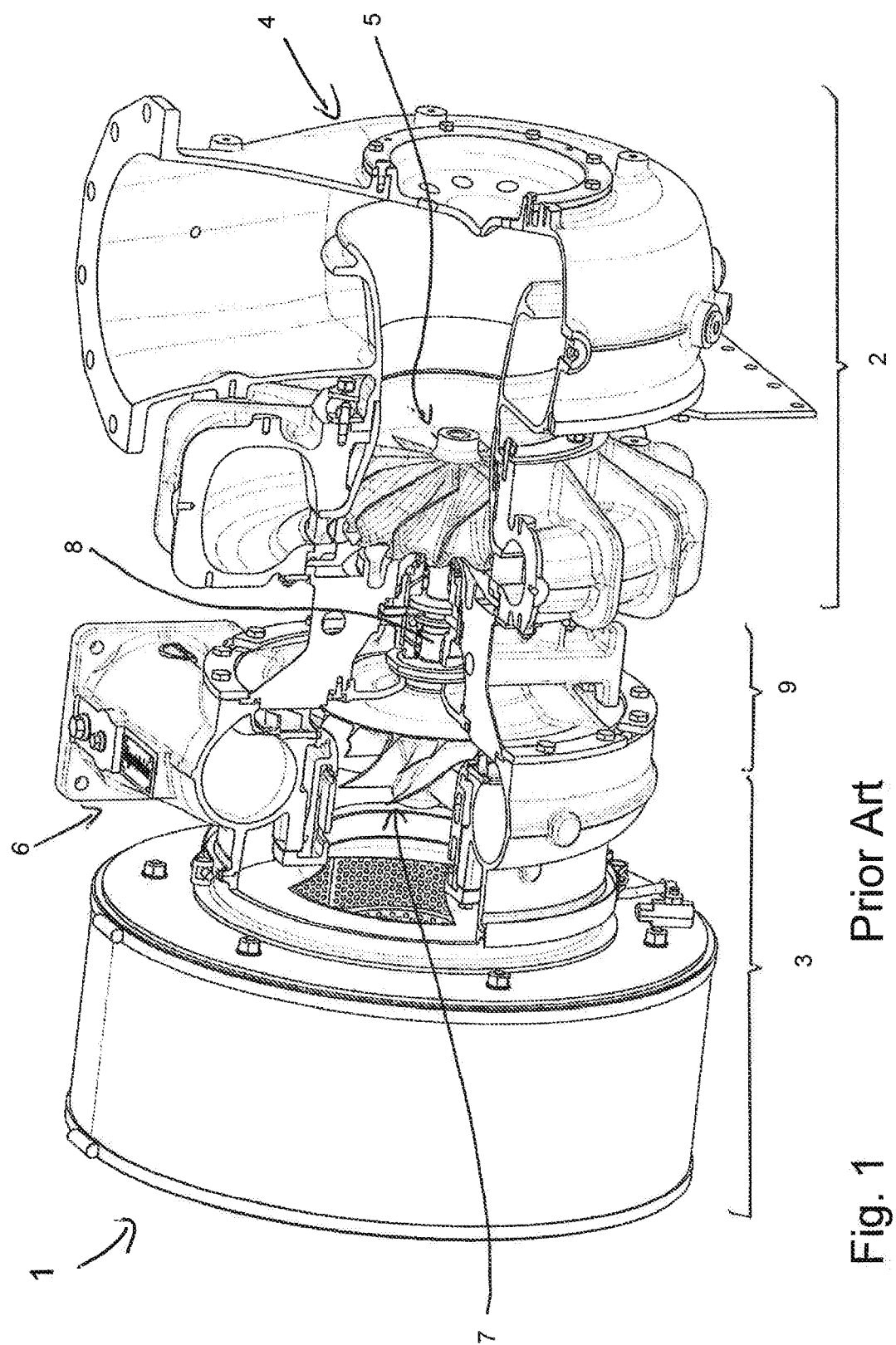
FIG. 1 is a cross sectional view through a turbocharger according to the prior art.

A turbocharger 1 comprises a turbine 2 for expanding a first medium, in particular for expanding exhaust gas of an internal combustion engine. A turbocharger 1, furthermore, comprises a compressor 3 for compressing a second medium, in particular charge air, namely utilizing energy extracted in the turbine 2 during the expansion of the first medium. The turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8, which is mounted in a bearing housing 9, wherein the bearing housing 9 is positioned between the turbine housing 4 and the compressor housing 5 and is connected to both the turbine housing 4 and the compressor housing 5.

Figure 2:
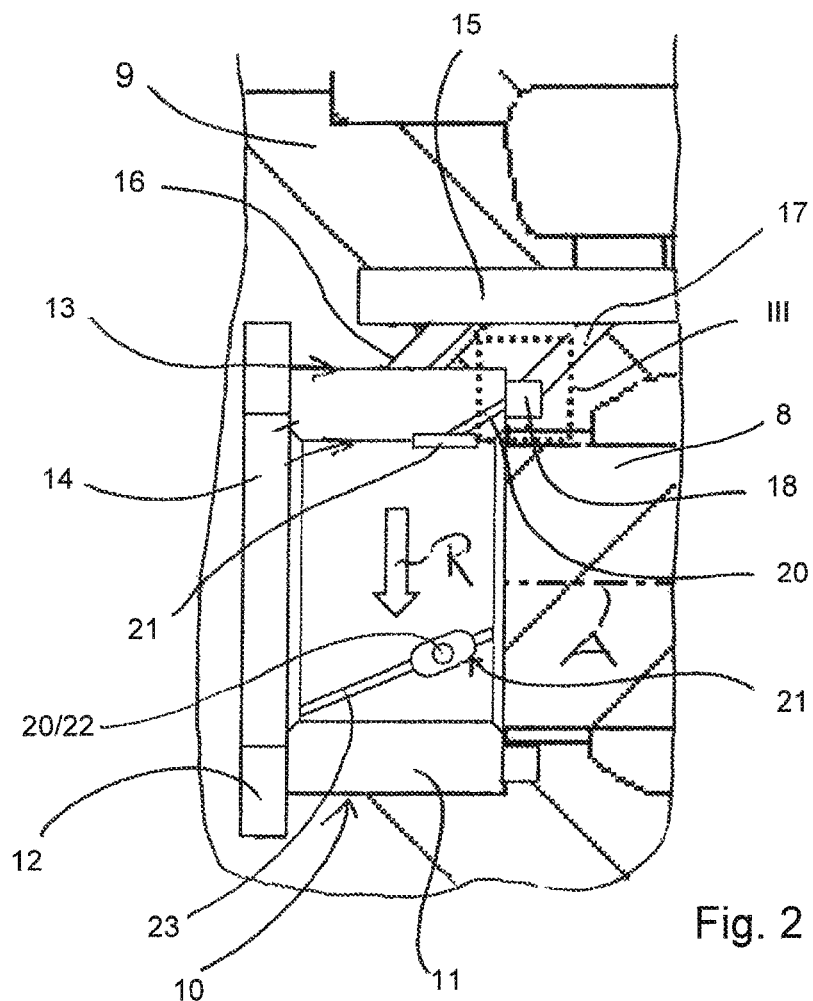
FIG. 2 is a cross sectional view through a first turbocharger according to the invention in the region of a bearing of the bearing housing.
Figure 3:
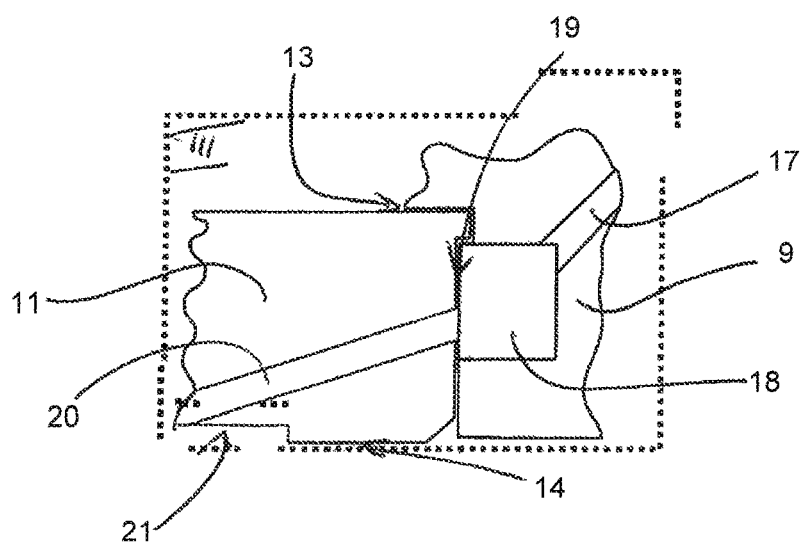
FIG. 3 is a cross-sectional view of the detail III of FIG. 2.

FIG. 2, 3 shows details of a turbocharger according to the invention in the region of a bearing 10 of the bearing housing 9, wherein the bearing 10 shown in FIG. 2 serves for mounting the shaft 8 of the turbocharger 1 coupling the turbine rotor 5 and the compressor rotor 7 in the bearing housing 9. Preferentially, two such bearings 10 are present, wherein a first bearing 10 acts on a section facing the turbine rotor 5 and a second bearing 10 acts on a section of the shaft 8 facing the compressor rotor 7.

The bearing 10 of FIG. 2, 3 comprises a bearing bush 11, which is mounted, via means which are not shown, in the bearing housing 9 in a rotationally fixed manner or on the bearing housing 9 in a rotationally fixed manner.

By mounting the bearing bush 11 in the bearing housing 9 in this rotationally fixed manner, the bearing bush 11 is embodied as housing-fixed assembly, which is stationary during the rotation of the shaft 8.

The axial position of the bearing bush 11 is fixed on the one hand by the bearing housing 9 and on the other hand by a cover 12, wherein an axial end of the bearing bush 11 comes to lie against stop formed by the bearing housing 9 and an axial end of the bearing bush 11 located opposite interacts with the cover 12. Between the axial end of the bearing bush 11, which comes to lie against the stop formed by the bearing housing 9, and the bearing housing 9, an axial gap 19 is formed.

Between the bearing bush 11 that is mounted in or on the bearing housing 9 in a rotationally fixed manner and the bearing housing 9, a radially outer lubricating gap 13 is formed, between the bearing bush 11 and the shaft 8 a radially inner lubricating gap 14 is formed. The radially outer lubricating gap 13 functions in particular as squeeze film damper.

Both the radially outer lubricating gap 13 and also the radially inner lubricating gap 14 are suppliable with lubricating oil emanating from an oil supply main line 15, namely either dependent on one another or preferentially independently of one another. In any case, at least one line 20 is introduced into the bearing bush 11, via which the radially inner lubricating gap 14 can be supplied with lubricating oil, namely in the case of a lubricating oil supply that is dependent on the outer lubricating oil gap 13 emanating from the outer lubricating oil gap 13 and in the case of a lubricating oil supply that is independent of the outer lubricating oil gap 13, emanating from the oil supply main line 15.

According to the invention present here it is proposed that the or each line 20 introduced into the bearing bush 11, which serves for the oil supply of the radially inner lubricating gap 14, leads into a lubricating oil pocket 21 that is introduced into a radially inner surface of the bearing bush 11, wherein the respective lubricating oil pocket 21, based on the axial length of the bearing bush 11, is placed off-center and preferentially set at an incline relative to the axial direction A of the bearing bush 11 and thus also relative to the direction of rotation R of the shaft 8.

Preferentially, multiple lines 20 are introduced into the bearing bush 11, which serve for the lubricating oil supply of the inner lubricating gap 14, wherein each of these lines 20 in each case leads into a lubricating oil pocket 21 which, based on the axial length of the bearing bush 11, is placed off-center and preferentially set at an incline relative to the axial direction A of the bearing bush 11 and the direction of rotation R of the shaft 8.

The lubricating oil pockets 21 merge into the lubricating oil grooves 23 which in the circumferential direction are embodied narrower than the lubricating oil pockets 21, wherein each of the lubricating oil grooves 23 is likewise set at an incline relative to the axial direction of the bearing bush 11 and the radial direction of the shaft 8. Here, the lubricating oil grooves 23 are set at an incline relative to the axial direction A of the bearing bush 11 and the direction of rotation R of the shaft 8 in such a manner that lubricating oil grooves 23 introduced into the bearing bush 11 diverge, emanating from the axial end of the bearing bush 11, via which the oil supply of the bearing bush 11 is effected, in the direction of an axial end of the bearing bush 11 located opposite, so that accordingly the respective lubricating oil groove 23, emanating from the axial end of the bearing bush 11, via which the oil supply of the bearing bush 11 is effected, slopes in the direction of the axial end of the bearing bush 11 located opposite.

In the exemplary embodiment of FIG. 2, 3, the oil supply of the bearing bush 11 is effected via that axial end of the bearing bush 11, which interacts with the stop of the bearing housing 9. Emanating from this axial end, the lubricating oil grooves 23 fall in the direction of the axial end of the bearing bush 11 located opposite or diverge in the direction of this axial end located opposite, which interacts with the cover 12.

The lubricating oil grooves 23 extend between the axial ends of the bearing bush 11. The lubricating oil pockets 21, into which a respective line 20 introduced into the bearing bush 11 leads with an orifice 22 for the lubricating oil supply of the radially inner lubricating gap 14, have a smaller width in the circumferential direction than the lubricating oil grooves 23, wherein the lubricating oil grooves 23, seen in the axial direction, extend almost continuously from an axial end of the bearing bush 11 in the direction of the other axial end of the bearing bush 11. In particular, the lubricating oil grooves 23 each terminate with a defined distance in front of these axial ends, wherein this distance is defined by the axial depth of a chamfer on the radially inner surface of the bearing bush 11 formed in the region of the axial ends. Based on the axial length of the bearing bush 11, the lubricating oil pockets 21 are placed off-center in the respective lubricating oil groove 23.

As shown in FIG. 2, the radially inner lubricating gap 14 and the radially outer lubricating gap 13 are independently suppliable with lubricating oil emanating from the oil supply main line 15. Accordingly, at least one first line 16 branches off the oil supply main line according to FIG. 2, via which oil emanating from the oil supply main line 15 is suppliable to the radially outer lubricating gap 13. Furthermore, at least one second line 17 branches off the oil supply main line 15 via which the radially inner lubricating gap 14 can be supplied with lubricating oil emanating from the oil supply main line 15 independently of the radially outer lubricating gap 13.

In the exemplary embodiment shown in FIG. 2, the or each first line 16, which serves for supplying the outer lubricating gap 13 with oil, leads into the radially outer lubricating gap 13 radially outside. The or each second line 17, which serves for the oil supply of the radially inner lubricating gap 14, leads into an annular passage 18 of the bearing housing 19, at an axial end or on an axial side of the bearing bush 11, namely on the side of the bearing bush 11 located opposite the cover 12.

This annular passage 18 is circumferentially introduced into the bearing housing 9 in the circumferential direction, namely axially laterally next to the bearing bush 11 on the side of the bearing bush 11 located opposite the cover 12.

According to FIG. 2, the lubricating oil, emanating from the annular passage 18, is suppliable to the radially inner lubricating gap 14 via the or each line 20 introduced into the bearing bush 11, which extends emanating from the annular passage 18 into the region of the radially inner lubricating gap 14 where it leads into the region of the lubricating oil pocket 21. Here, the or each line 20 introduced into the bearing bush 11 is set at an incline relative to the axial direction of the bearing bush 11 and/or relative to the radial direction of the bearing bush 11.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A turbocharger comprising:
   a turbine for expanding a first medium, wherein the turbine comprises a turbine housing and a turbine rotor;
   a compressor for compressing a second medium utilizing energy extracted in the turbine during the expansion of the first medium, wherein the compressor comprises a compressor housing and a compressor rotor coupled to the turbine rotor via a shaft;
   a bearing housing arranged between the turbine housing and the compressor housing, the turbine housing and the compressor housing connected to the bearing housing;
   at least one bearing for mounting the shaft in the bearing housing, the bearing comprising a bearing bush mounted in the bearing housing in a rotationally fixed manner;
   a radially outer lubricating gap formed between the bearing bush and the bearing housing;
   a radially inner lubricating gap formed between the bearing bush and the shaft;
   at least one line formed in the bearing bush for supplying the radially inner lubricating gap with lubricating oil; and
   at least one lubricating oil pocket,
   wherein the at least one line formed in the bearing bush, which serves as the oil supply for the radially inner lubricating gap leads into the at least one lubricating oil pocket of the bearing bush, and the at least one lubricating oil pocket is placed off-center based on an axial length of the bearing bush.

2. The turbocharger according to claim 1, wherein the at least one lubricating oil pocket is set at an incline relative to the axial direction of the bearing bush.

3. The turbocharger according to claim 2, wherein the at least one lubricating oil pocket is set at an incline relative to the direction of rotation of the shaft.

4. The turbocharger according to claim 2, wherein the at least one lubricating oil pocket is merging into a lubricating oil groove which is set at an incline relative to the direction of rotation of the shaft.

5. The turbocharger according to claim 1, wherein the at least one lubricating oil pocket is set at an incline relative to the direction of rotation of the shaft.

6. The turbocharger according to claim 5, wherein the at least one lubricating oil pocket is merging into a lubricating oil groove which is set at an incline relative to the direction of rotation of the shaft.

7. The turbocharger according to claim 1, wherein the at least one lubricating oil pocket is merging into at least one lubricating oil groove which is set at an incline relative to the direction of rotation of the shaft.

8. The turbocharger according to claim 7, wherein the at least one lubricating oil groove is set at an incline relative to the axial direction of the bearing bush.

9. The turbocharger according to claim 8, wherein the at least one lubricating oil groove formed in the bearing bush slopes, from a first axial end of the bearing bush, in the direction of a second opposite axial end of the bearing bush.

10. The turbocharger according to claim 8, wherein the at least one lubricating oil groove formed in the bearing bush, diverge from a first axial end of the bearing bush in the direction of a second opposite axial end of the bearing bush.

11. The turbocharger according to claim 7, wherein the at least one lubricating oil groove formed in the bearing bush slopes, from a first axial end of the bearing bush, in the direction of a second opposite axial end of the bearing bush.

12. The turbocharger according to claim 11, wherein the at least one lubricating oil groove formed in the bearing bush, diverge from a first axial end of the bearing bush in the direction of a second opposite axial end of the bearing bush.

13. The turbocharger according to claim 7, wherein the at least one lubricating oil groove formed in the bearing bush, diverge from a first axial end of the bearing bush in the direction of a second opposite axial end of the bearing bush.

14. The turbocharger according to claim 1, additionally comprising an oil supply main line and at least one first and second line branching off the oil supply main line; wherein the radially outer lubricating gap and the radially inner lubricating gap, emanating from an oil supply main line, are supplied with lubricating oil independently of one another in that the radially outer lubricating gap is supplied with lubricating oil via the at least one first line and the radially inner lubricating gap is supplied with lubricating oil via the at least one second line.

15. The turbocharger according to claim 14, wherein the at least one first line leads radially outside into the radially outer lubricating gap.

16. The turbocharger according to claim 15, wherein the bearing housing comprises an annular passage and the at least one second line leads on an axial side of the bearing bush into the annular passage.

17. The turbocharger according to claim 14, wherein the bearing housing comprises an annular passage and the at least one second line, leads on an axial side of the bearing bush into the annular passage.

18. The turbocharger according to claim 17, wherein the at least one line formed in the bearing bush delivers lubricating oil emanating from the annular passage into the region of the radially inner lubricating gap.

19. The turbocharger according to claim 18, wherein the at least one line formed in the bearing bush is set at an incline relative to an axial direction and/or relative to a radial direction of the bearing bush.

\* \* \* \* \*